US012643404B2

(12) United States Patent
Stout

(10) Patent No.: US 12,643,404 B2
(45) Date of Patent: Jun. 2, 2026

(54) SYSTEM AND METHOD FOR ROAD SIGN TRANSLATION AND DISPLAY

(71) Applicant: Honda Motor Co., Ltd., Tokyo (JP)

(72) Inventor: Jesse P. Stout, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 121 days.

(21) Appl. No.: 18/605,365

(22) Filed: Mar. 14, 2024

(65) Prior Publication Data

US 2025/0289306 A1     Sep. 18, 2025

(51) Int. Cl.
| | |
|---|---|
| *G06V 20/58* | (2022.01) |
| *B60K 35/22* | (2024.01) |
| *B60K 35/23* | (2024.01) |
| *B60K 35/28* | (2024.01) |
| *G06F 16/23* | (2019.01) |
| *G06F 40/58* | (2020.01) |
| *G06V 10/75* | (2022.01) |

(52) U.S. Cl.
CPC .............. *B60K 35/23* (2024.01); *B60K 35/22* (2024.01); *B60K 35/28* (2024.01); *G06F 16/2379* (2019.01); *G06F 40/58* (2020.01); *G06V 10/75* (2022.01); *G06V 20/582* (2022.01); *B60K 2360/166* (2024.01); *B60K 2360/21* (2024.01)

(58) Field of Classification Search
None
See application file for complete search history.

(56) References Cited

U.S. PATENT DOCUMENTS

| | | | |
|---|---|---|---|
| 8,983,136 B2 | 3/2015 | Liu et al. | |
| 9,536,156 B2 | 1/2017 | Wey et al. | |
| 9,697,430 B2 | 7/2017 | Kristensen | |
| 9,971,768 B2 | 5/2018 | Murthy et al. | |
| 10,127,466 B2 * | 11/2018 | Stenneth ................ | G06N 20/20 |
| 10,147,004 B2 | 12/2018 | Atsmon et al. | |
| 10,462,426 B2 | 10/2019 | Schofield et al. | |
| 10,510,248 B2 | 12/2019 | Hou et al. | |
| 10,783,385 B2 | 9/2020 | Bender et al. | |
| 10,846,545 B2 | 11/2020 | Zinner et al. | |

(Continued)

FOREIGN PATENT DOCUMENTS

| | | |
|---|---|---|
| CN | 111231833 | 6/2020 |
| EP | 1503354 | 10/2006 |

(Continued)

*Primary Examiner* — Parul H Gupta

(74) *Attorney, Agent, or Firm* — Rankin, Hill & Clark LLP

(57) ABSTRACT

A vehicle system is configured for translating and displaying signs. The vehicle system includes at least one computer configured to access to a database of model signs, where the database is stored local to the at least one computer and includes translations associated with the model signs. The system also includes a camera configured to generate image data, and transmit the image data to the at least one computer, where the at least one computer determines whether the image data indicates a detected sign, and whether the detected sign matches one of the model signs in the database. The system also includes a display operatively connected with the at least one computer for displaying a translation associated with a matching model sign in the database when the at least one computer determines that the image data indicates a detected sign that matches one of the model signs.

19 Claims, 8 Drawing Sheets

(56) References Cited

U.S. PATENT DOCUMENTS

| | | | | |
|---|---|---|---|---|
| 2012/0075168 A1* | 3/2012 | Osterhout | ............... | G06F 3/017 |
| | | | | 345/8 |
| 2012/0194553 A1* | 8/2012 | Osterhout | ............... | G06F 3/017 |
| | | | | 345/633 |
| 2012/0249797 A1* | 10/2012 | Haddick | ................ | G04G 21/04 |
| | | | | 701/491 |
| 2013/0127980 A1* | 5/2013 | Haddick | ................ | G06F 3/013 |
| | | | | 348/14.08 |
| 2013/0278631 A1* | 10/2013 | Border | ............... | G06F 3/04842 |
| | | | | 345/633 |
| 2013/0343608 A1* | 12/2013 | Bar | ........................ | G06V 20/63 |
| | | | | 382/103 |
| 2016/0351051 A1 | 12/2016 | Murthy et al. | | |
| 2020/0132498 A1 | 4/2020 | Matsumaru | | |
| 2020/0324787 A1 | 10/2020 | Wang et al. | | |
| 2020/0393269 A1 | 12/2020 | Doemling et al. | | |
| 2021/0048308 A1 | 2/2021 | Ido | | |
| 2021/0374442 A1 | 12/2021 | Wright et al. | | |
| 2025/0005351 A1* | 1/2025 | Chandler | ............. | G06N 3/0442 |

FOREIGN PATENT DOCUMENTS

| | | | | |
|---|---|---|---|---|
| FR | 2905024 A1 * | 2/2008 | ............... | G08G 1/20 |
| JP | 2020197862 | 12/2020 | | |
| KR | 20110101990 | 9/2011 | | |
| WO | WO2017102634 | 6/2017 | | |

* cited by examiner

| Language | Country | Stop | No Parking | Speed Limit |
|---|---|---|---|---|
| English | US | STOP | (No Parking symbol) | SPEED LIMIT 50 |
| Spanish | Mexico | ALTO | (No Parking symbol) | 50 km/h |

154   152                                                                                      160

142, 204

| Language | Country | Stop | No Parking | Speed Limit |
|----------|---------|------|-----------|-------------|
| English | US | STOP | (no parking P symbol) | SPEED LIMIT 50 |
| Spanish | Mexico | ALTO | (no parking E symbol) | 50 km/h |

154   152                                                                                 160   210

150

199

| Language | Country | Stop | No Parking | Speed Limit |
|----------|---------|------|-----------|-------------|
| English | US | STOP | (no parking P symbol) | SPEED LIMIT 50 |
| Japanese | Japan | 止まれ | (no parking symbol) | 50 |

| Language | Country | Stop | No Parking | Speed Limit |
|---|---|---|---|---|
| English | US | STOP | (No Parking - P) | SPEED LIMIT 50 |
| Spanish | Mexico | ALTO | (No Parking - E) | 50 km/h |
| Japanese | Japan | 止まれ | (No Parking) | 50 |

244

止まれ

STOP

150

114

| 二輪車 | 二輪車 | 250 |
| 2 wheel vehicles (stop here) | | 160 |
| 四輪車 | 四輪車 | 252 |
| 4 wheel vehicles (stop here) | | 160 |

242

200

114

150

170

STOP

240

150

STOP

242

114

| 2 wheel vehicles (stop here) | 160 |
| 4 wheel vehicles (stop here) | 160 |

300

302  Generating and executing an automated travel path of the AV based on the travel model 304  Identifying an interaction between the AV and the second vehicle while executing the automated travel path 310  Determining a scenario type of the interaction between the AV and the second vehicle

SYSTEM AND METHOD FOR ROAD SIGN TRANSLATION AND DISPLAY

BACKGROUND

Known translation systems configured for mobile use often require constant connectivity to a central processing platform, or otherwise lack adaptability to a surrounding environment. By requiring connectivity to a central processing platform, such translation systems are often too slow and unreliable to be practically employed in a vehicle for travel. As such, there is a demand for a mobile translation system which can provide navigational aid while requiring minimal communication with a central processing resource.

BRIEF DESCRIPTION

According to one aspect, a vehicle system is configured for translating and displaying signs. The vehicle system includes at least one computer configured to access to a database of model signs, where the database is stored local to the at least one computer and includes translations associated with the model signs. The vehicle system also includes a camera configured to generate image data, and transmit the image data to the at least one computer, where the at least one computer determines whether the image data indicates a detected sign, and whether the detected sign matches one of the model signs in the database. A model sign matching a detected sign is a matching model sign. The vehicle system also includes a display operatively connected with the at least one computer for displaying a translation associated with the matching model sign in the database when the at least one computer determines that the image data indicates a detected sign that matches one of the model signs.

According to another aspect, a method for translating and displaying signs includes generating image data using a camera, and transmitting the image data to at least one computer configured to access to a database that is stored local to the at least one computer and includes model signs and translations associated with the model signs. The method also includes determining whether the image data indicates a detected sign, and whether the detected sign matches one of the model signs in the database using the at least one computer, where a model sign matching the detected sign is a matching model sign. The method also includes displaying a translation associated with the matching model sign in the database when the at least one computer determines that the image data indicates a detected sign that matches one of the model signs.

According to another aspect, a non-transitory computer readable storage medium stores instructions that, when executed by a computer having a processor, causes the processor to perform a method. The method includes generating image data using a camera, and transmitting the image data to at least one computer configured to access to a database that is stored local to the at least one computer and includes model signs and translations associated with the model signs. The method also includes determining whether the image data indicates a sign, and determining whether the sign matches one of the model signs in the database using the at least one computer, where a model sign matching the detected sign is a matching model sign. The method also includes displaying a translation associated with the matching model sign in the database when the at least one computer determines that the image data indicates a detected sign that matches one of the model signs.

DETAILED DESCRIPTION

Figure 1:
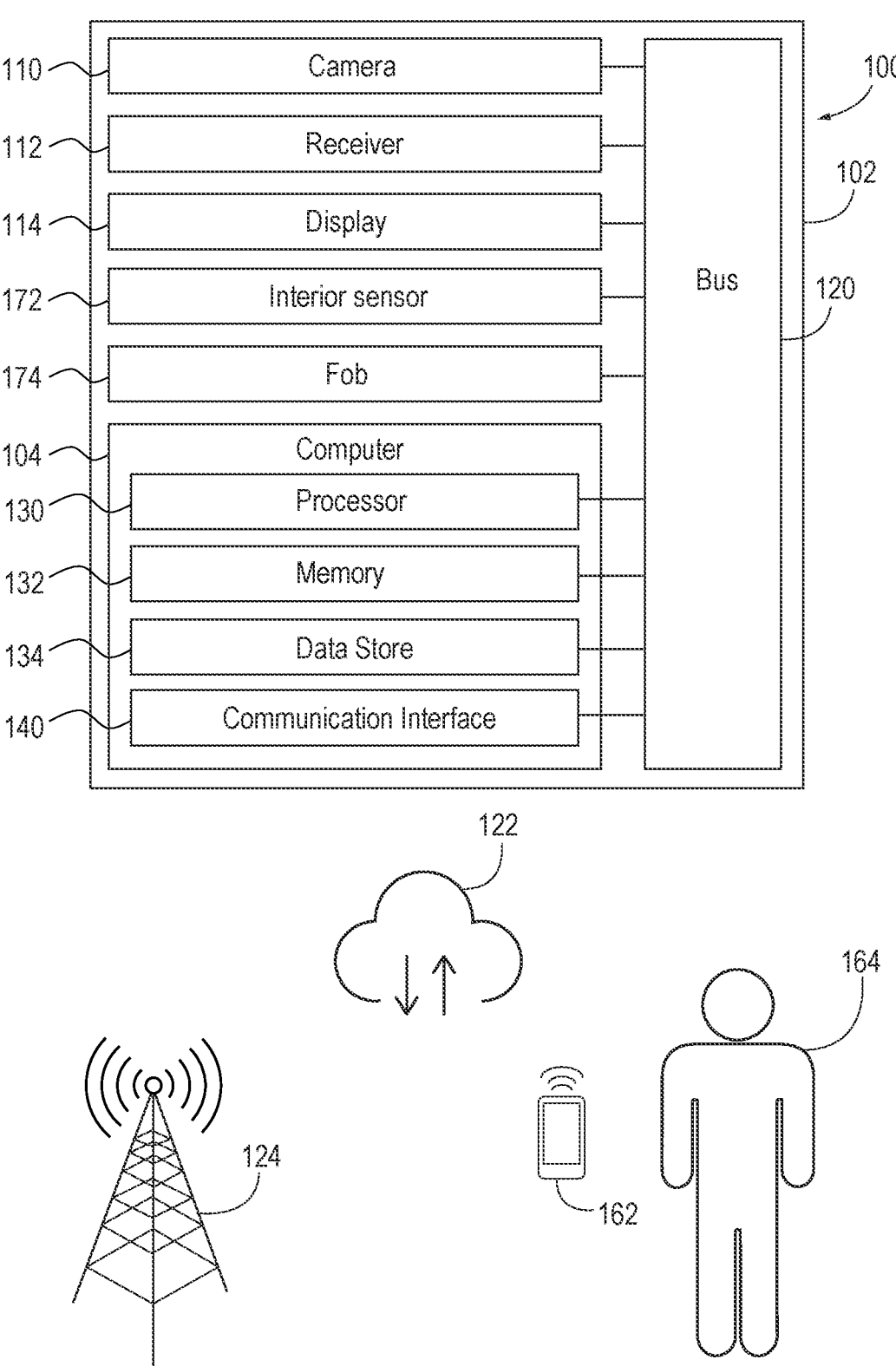
FIG. 1 is an exemplary operating environment of a translation system for translating and displaying signs.

The systems and methods disclosed herein are configured to detect, translate, and display signs to a user. A vehicle including the disclosed systems is configured to detect and translate road signs by checking image data against a local database that is updated directly from a cloud computing platform via a network, and updated indirectly from the cloud computing platform through vehicle to vehicle communication with a plurality of other vehicles. A display included in the vehicle may be a dashboard display, a heads-up display, or an augmented reality display for providing a driver with translations to detected signs in a surrounding environment of the vehicle.

Definitions

The following includes definitions of selected terms employed herein. The definitions include various examples and/or forms of components that fall within the scope of a term and that may be used for implementation. The examples are not intended to be limiting. Furthermore, the components discussed herein, may be combined, omitted, or organized with other components or into different architectures.

"Bus," as used herein, refers to an interconnected architecture that is operably connected to other computer components inside a computer or between computers. The bus may transfer data between the computer components. The bus may be a memory bus, a memory processor, a peripheral bus, an external bus, a crossbar switch, and/or a local bus, among others. The bus may also interconnect with components inside a device using protocols such as Media Oriented Systems Transport (MOST), Controller Area network (CAN), Local Interconnect network (LIN), among others.

"Component," as used herein, refers to a computer-related entity (e.g., hardware, firmware, instructions in execution, combinations thereof). Computer components may include, for example, a process running on a processor, a processor, an object, an executable, a thread of execution, and a computer. A computer component(s) may reside within a process and/or thread. A computer component may be localized on one computer and/or may be distributed between multiple computers.

"Computer communication," as used herein, refers to a communication between two or more communicating devices (e.g., computer, personal digital assistant, cellular telephone, network device, vehicle, connected thermometer, infrastructure device, roadside equipment) and may be, for example, a network transfer, a data transfer, a file transfer, an applet transfer, an email, a hypertext transfer protocol (HTTP) transfer, and so on. A computer communication may occur across any type of wired or wireless system and/or network having any type of configuration, for example, a local area network (LAN), a personal area network (PAN), a wireless personal area network (WPAN), a wireless network (WAN), a wide area network (WAN), a metropolitan area network (MAN), a virtual private network (VPN), a cellular network, a token ring network, a point-to-point network, an ad hoc network, a mobile ad hoc network, a vehicular ad hoc network (VANET), among others.

Computer communication may utilize any type of wired, wireless, or network communication protocol including, but not limited to, Ethernet (e.g., IEEE 802.3), WiFi (e.g., IEEE 802.11), communications access for land mobiles (CALM), WiMax, Bluetooth, Zigbee, ultra-wideband (UWAB), multiple-input and multiple-output (MIMO), telecommunications and/or cellular network communication (e.g., SMS, MMS, 3G, 4G, LTE, 5G, GSM, CDMA, WAVE, CAT-M, LoRa), satellite, dedicated short range communication (DSRC), among others.

"Communication interface" as used herein may include input and/or output devices for receiving input and/or devices for outputting data. The input and/or output may be for controlling different features, components, and systems. Specifically, the term "input device" includes, but is not limited to: keyboard, microphones, pointing and selection devices, cameras, imaging devices, video cards, displays, push buttons, rotary knobs, and the like. The term "input device" additionally includes graphical input controls that take place within a user interface which may be displayed by various types of mechanisms such as software and hardware-based controls, interfaces, touch screens, touch pads or plug and play devices. An "output device" includes, but is not limited to, display devices, and other devices for outputting information and functions.

"Computer-readable medium," as used herein, refers to a non-transitory medium that stores instructions and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device may read.

"Database," as used herein, is used to refer to a table. In other examples, "database" may be used to refer to a set of tables. In still other examples, "database" may refer to a set of data stores and methods for accessing and/or manipulating those data stores. In one embodiment, a database may be stored, for example, at a disk, data store, and/or a memory. A database may be stored locally or remotely and accessed via a network.

"Data store," as used herein may be, for example, a magnetic disk drive, a solid-state disk drive, a floppy disk drive, a tape drive, a Zip drive, a flash memory card, and/or a memory stick. Furthermore, the disk may be a CD-ROM (compact disk ROM), a CD recordable drive (CD-R drive), a CD rewritable drive (CD-RW drive), and/or a digital video ROM drive (DVD ROM). The disk may store an operating system that controls or allocates resources of a computing device.

"Display," as used herein may include, but is not limited to, LED display panels, LCD display panels, CRT display, touch screen displays, among others, that often display information. The display may receive input (e.g., touch input, keyboard input, input from various other input devices, etc.) from a user. The display may be accessible through various devices, for example, though a remote system. The display may also be physically located on a portable device or mobility device.

"Logic circuitry," as used herein, includes, but is not limited to, hardware, firmware, a non-transitory computer readable medium that stores instructions, instructions in execution on a machine, and/or to cause (e.g., execute) an action(s) from another logic circuitry, module, method and/or or system. Logic circuitry may include and/or be a part of a processor controlled by an algorithm, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics.

"Memory," as used herein may include volatile memory and/or nonvolatile memory. Non-volatile memory may include, for example, ROM (read only memory), PROM (programmable read only memory), EPROM (erasable PROM), and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDRSDRAM), and direct RAM bus RAM (DRRAM). The memory may store an operating system that controls or allocates resources of a computing device.

"Module," as used herein, includes, but is not limited to, non-transitory computer readable medium that stores instructions, instructions in execution on a machine, hardware, firmware, software in execution on a machine, and/or combinations of each to perform a function(s) or an action(s), and/or to cause a function or action from another module, method, and/or system. A module may also include logic, a software-controlled microprocessor, a discrete logic circuit, an analog circuit, a digital circuit, a programmed logic device, a memory device containing executing instructions, logic gates, a combination of gates, and/or other circuit components. Multiple modules may be combined into one module and single modules may be distributed among multiple modules.

"Operable connection," or a connection by which entities are "operably connected," is one in which signals, physical communications, and/or logical communications may be sent and/or received. An operable connection may include a wireless interface, firmware interface, a physical interface, a data interface, and/or an electrical interface.

"Portable device," as used herein, is a computing device typically having a display screen with user input (e.g., touch, keyboard) and a processor for computing. Portable devices include, but are not limited to, handheld devices, mobile devices, smart phones, laptops, tablets, e-readers, smart speakers. In some embodiments, a "portable device" could refer to a remote device that includes a processor for computing and/or a communication interface for receiving and transmitting data remotely.

"Processor," as used herein, processes signals and performs general computing and arithmetic functions. Signals processed by the processor may include digital signals, data signals, computer instructions, processor instructions, messages, a bit, a bit stream, that may be received, transmitted and/or detected. Generally, the processor may be a variety of various processors including multiple single and multicore processors and co-processors and other multiple single and multicore processor and co-processor architectures. The processor may include logic circuitry to execute actions and/or algorithms. The processor may also include any number of modules for performing instructions, tasks, or executables.

"User" as used herein may be a biological being, such as humans (e.g., adults, children, infants, etc.).

A "wearable computing device," as used herein can include, but is not limited to, a computing device component (e.g., a processor) with circuitry that can be worn or attached to user. In other words, a wearable computing device is a computer that is subsumed into the personal space of a user. Wearable computing devices can include a display and can include various sensors for sensing and determining various parameters of a user. For example, location, motion, and physiological parameters, among others. Exemplary wearable computing devices can include, but are not limited to, watches, glasses, clothing, gloves, hats, helmets, visors, shirts, jewelry, rings, earrings necklaces, armbands, leashes, collars, shoes, earbuds, headphones and personal wellness devices.

System Overview

Referring now to the drawings, the drawings are for purposes of illustrating one or more exemplary embodiments and not for purposes of limiting the same. FIG. 1 is an exemplary component diagram of an operating environment 100 of a translation system 102 including a computer 104, a camera 110, a receiver 112, and a display 114.

Each of the computer 104, the camera 110, the receiver 112, and the display 114 may be interconnected by a bus 120. The components of the operating environment 100, as well as the components of other systems, hardware architectures, and software architectures discussed herein, may be combined, omitted, or organized into different architectures for various embodiments.

The camera 110 is configured to generate image data, and transmit the image data to the computer 104. The camera 110 may include a combination of optical, infrared, or other cameras for generating the image data. The translation system 102 may further include light detection and ranging (LiDAR) systems, position sensors, proximity sensors, and a variety of other sensors and sensor combinations similar to those found in known systems, including systems provided in vehicles, for detecting signs, and therefore will not be described in detail.

The computer 104 is implemented as a part of the translation system 102, and connected to a cloud computing platform 122 via a network 124. The computer 104 may be capable of providing wired or wireless computer communications utilizing various protocols to send and receive electronic signals internally to and from components of the operating environment 100. Additionally, the computer 104 may be operably connected for internal computer communication via the bus 120 (e.g., a Controller Area Network (CAN) or a Local Interconnect Network (LIN) protocol bus) to facilitate data input and output between the computer device 104 and the components of the operating environment 100.

The computing device 104 includes a processor 130, a memory 132, a data store 134, and a communication interface 140, which are each operably connected for computer communication via the bus 120. The communication interface 140 provides software and hardware to facilitate data input and output between the components of the computer 104 and other components, networks, and data sources described herein.

Figure 2:
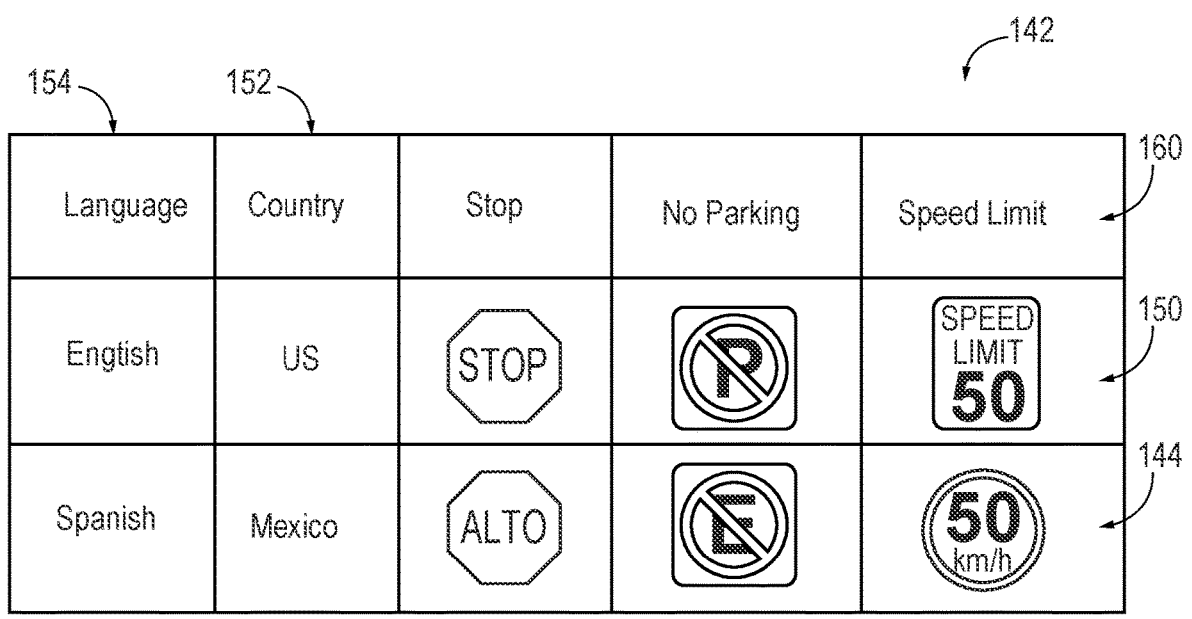
FIG. 2 is a database of model signs maintained by the translation system.

The memory 132 is local to the processor 130 and, as shown in FIG. 2, stores data including a database 142 of model signs 144. With continued reference to FIG. 2, the database 142 also includes translations 150, jurisdiction data 152, language data 154, and text translations 160 associated with the model signs 144.

The processor 130 is configured to determine whether the image data from the camera 110 indicates a detected sign. In this regard, the processor 130 may detect road signs, stoplights, street markings, traffic pylons, and other forms of indicia provided to guide traffic, including vehicle and foot traffic, as detected signs based on the image data.

The processor 130 is also configured to determine whether a detected sign matches a model sign 144 in the database 142. In this regard, the processor 130 is configured to process the image data and determine whether a detected sign matches any model sign 144 in the database 142.

In an embodiment, the processor 130 employs a machine learning algorithm to process the image data for determining whether the image data indicates a detected sign and whether the detected sign matches a model sign 144. In a further embodiment, the processor 130 includes a camera electronic control unit (ECU) that is part of an advanced driving assistance system (ADAS) including traffic sign recognition (TSR). The camera ECU is operatively connected with the camera 110 for determining whether the image data generated by the camera indicates a detected sign. The camera ECU may transmit information determined from the image data to other components of the computer 104, including other components of the processor 130, and optionally via the bus 120 for determining whether the detected sign matches the model sign 144. By matching a detected sign to a model sign 144 in the database 142, the processor 130 is configured to identify a translation 150, a jurisdiction 152, a language 154, and a text translation 160 in the database 142 that may be associated with the detected sign.

Referring back to FIG. 1, the receiver 112 is a part of a global positioning system (GPS) and is configured for receiving location signals, where the computer 104 determines and records location data indicating a position of the receiver 112 based on the location signals received. The computer 104 is also configured to access map information indicating locations of political borders with respect to the location data, and determine a local jurisdiction with respect to the receiver 112. The computer 104 may store the map information in the memory 132 and the data store 134 for accessing the map information, and may access the map information stored on the cloud computing platform 122.

The local jurisdiction of the receiver 112 determined by the computer 104 may be any combination of a village, township, municipality, city, county, state, province, country, and international entity that governs a surrounding environment of the receiver 112. As an example, the computer 104 may determine Calexico, California, United States as the local jurisdiction of the receiver 112.

The computer 104 is configured to determine whether the receiver 112 has crossed a political border of the local jurisdiction based on the location data and the map information. The computer 104 is also configured to update the database 142 when the position of the receiver 112 crosses a political border, in accordance with a local jurisdiction including a most recently recorded position of the receiver 122.

As such, the computer 104 is configured to maintain the database 142 based on a current local jurisdiction of the receiver 112. Continuing the example described above, and with reference to FIG. 2, when the computer 104 determines that the receiver 112 is approaching, crossing, or has crossed the political border of Calexico, California, in the United States to Primera, Mexicali, Baja California, in Mexico, the computer 104 updates the database 142 to include model signs 144 relevant to jurisdictions including Primera, Mexicali, Baja California, and Mexico, and removes model signs 144 that are only relevant to jurisdictions including Calexico, California, and the United States. The computer 104 is configured to update the database 142 in this manner based on information that may be stored local to the computer 104, or stored on the cloud computing platform 122.

By updating the database 142 in this manner, the computer 104 focuses the database 142 to model signs 144 relevant to the local jurisdiction of the receiver 112. As such, the computer 104 reduces a number of model signs 144 required in the database 142 to reliably determine which model sign 144, if any, matches a detected sign from the image data. Also, the computer 104 removes model signs 144 from foreign jurisdictions, where the model signs 144 may have a similar appearance but a dissimilar meaning to other model signs 144 in the database 142. Further, the reduced number of model signs 144 in the database 142 improves an efficiency and reliability in processing the image data with an employed machine learning algorithm to determine a detected sign and match the detected sign to a model sign 144.

The computer 104 may restrict the model signs 144 included in the database 142 to signs found in a geographic area defined by a jurisdiction type such as a local jurisdiction, a state jurisdiction, and a national jurisdiction for improving the reliability, efficiency, and applicability of the computer 104 in determining which model sign 144 in the database 142 matches a detected sign. Further, the computer 104 may restrict the model signs 144 included in the database 142 to signs found in a geographic area defined by districts or portions of jurisdictions local to the receiver 112 to further limit an overall number of model signs 144 in the database 142.

Referring back to FIG. 1, the computer 104, the camera 110, and the display 114 are arranged locally to the receiver 112. With this construction, the computer 104 is configured to associate image data from the camera 110 with location information from the receiver 112 to determine a location of a detected sign. Additionally, the computer 104 is configured to process the image data from the camera 110 locally, without accessing the cloud computing platform 122 or otherwise communicating with an external device via the network 124.

The display 114 is operatively connected with the computer 104 for displaying a translation 150 associated with a model sign 144 in the database 142 when the computer 104 determines that the image data indicates a detected sign that matches the model sign 144. In an embodiment, the computer 104, the camera 110, the receiver 112, and the display 114 are provided in a mobile device 162. The mobile device 162 may be mounted to a scooter, bicycle, or other vehicle, or carried by a user 164 for operating the translation system 102 during travel. While, in the depicted embodiment, the mobile device 162 is a smart phone, the mobile device 162 may additionally or alternatively include a variety of portable electronic devices and wearable computing devices operated by the user 164.

Figure 3:
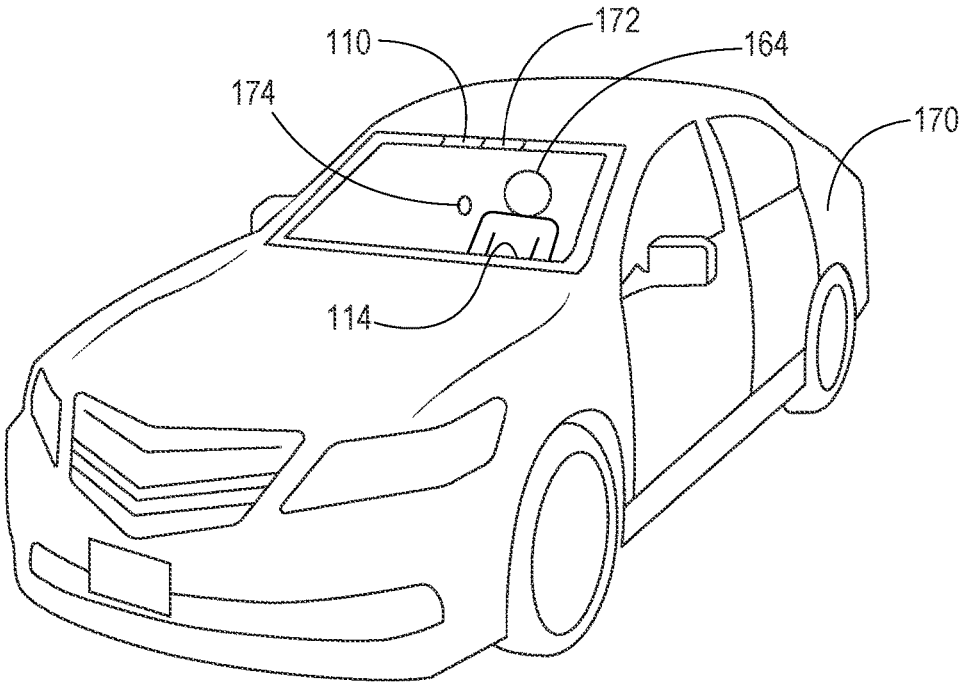
FIG. 3 is a perspective view of a vehicle included in the translation system.

FIG. 3 depicts an embodiment of the translation system 102 integrated into a vehicle 170 for displaying translations 150 of detected signs to the user 164 as a driver of the vehicle 170. In this regard, the computer 104 is an electronic control unit (ECU) included in the vehicle 170, and the camera 110 is mounted on the vehicle 170 for capturing the image data and detecting signs in a surrounding environment of the vehicle 170. The display 114 is at least one of a dashboard display, a heads-up display, and an augmented reality display provided in the vehicle 170 as described in further detail below.

The vehicle 170 further includes an interior sensor 172 fixed to the vehicle 170, and a fob 174 held by the user 164. The interior sensor 172 and the fob 174 are each configured to generate occupant information and transmit the occupant information to the computer 104.

The computer 104 is configured to determine a number of occupants in the vehicle 170 and identify the occupants of the vehicle 170, including the user 164, based on the occupant information received from the interior sensor 172. In this regard, the interior sensor 172 may include a combination of optical, infrared, or other cameras, LiDAR systems, position sensors, proximity sensors, weight sensors, and a variety of other sensors and sensor combinations similar to those found in known vehicles for generating occupant information indicating a number and identification of occupants in the vehicle 170, and therefore will not be described in detail.

The computer 104 associates the fob 174 with the user 164 based on user information that may be stored in the memory 132 and the data store 134, and accessed on the cloud computing platform 122 via the network 124. The computer 104 is also configured to determine a location of the fob 174 with respect to the vehicle 170. As such, the computer 104 is configured to detect and identify the user 164 in the vehicle 170 as the driver based on a detected location of the fob 174.

In this regard, the fob 174 includes an antenna and microchip as part of a radio frequency identification (RFID) system included in the vehicle 170. In an embodiment, the interior sensor 172 is configured to generate information indicating the location of the fob 174 with respect to the vehicle 170 and transit the generated information to the computer 104.

Referring back to FIG. 1, the memory 132 stores user information including a language and a jurisdiction associated with the user, which is input into the translation system 102 as a user setting by the user 164 or an associated entity such as a car rental company providing the vehicle 170 to the user 164. As such, the computer 104 is configured to determine a language and a jurisdiction original to the user 164 based on occupant information received from the fob 174 indicating the user 164 as the driver of the vehicle 170, and based on the user information stored in the memory 132. The computer 104 is also configured to update the database 142 to include translations 150 associated with the model signs 144, the language original to the user 164, and the jurisdiction original to the user 164 in the database 142 based on the user information.

Figures 4, 5:
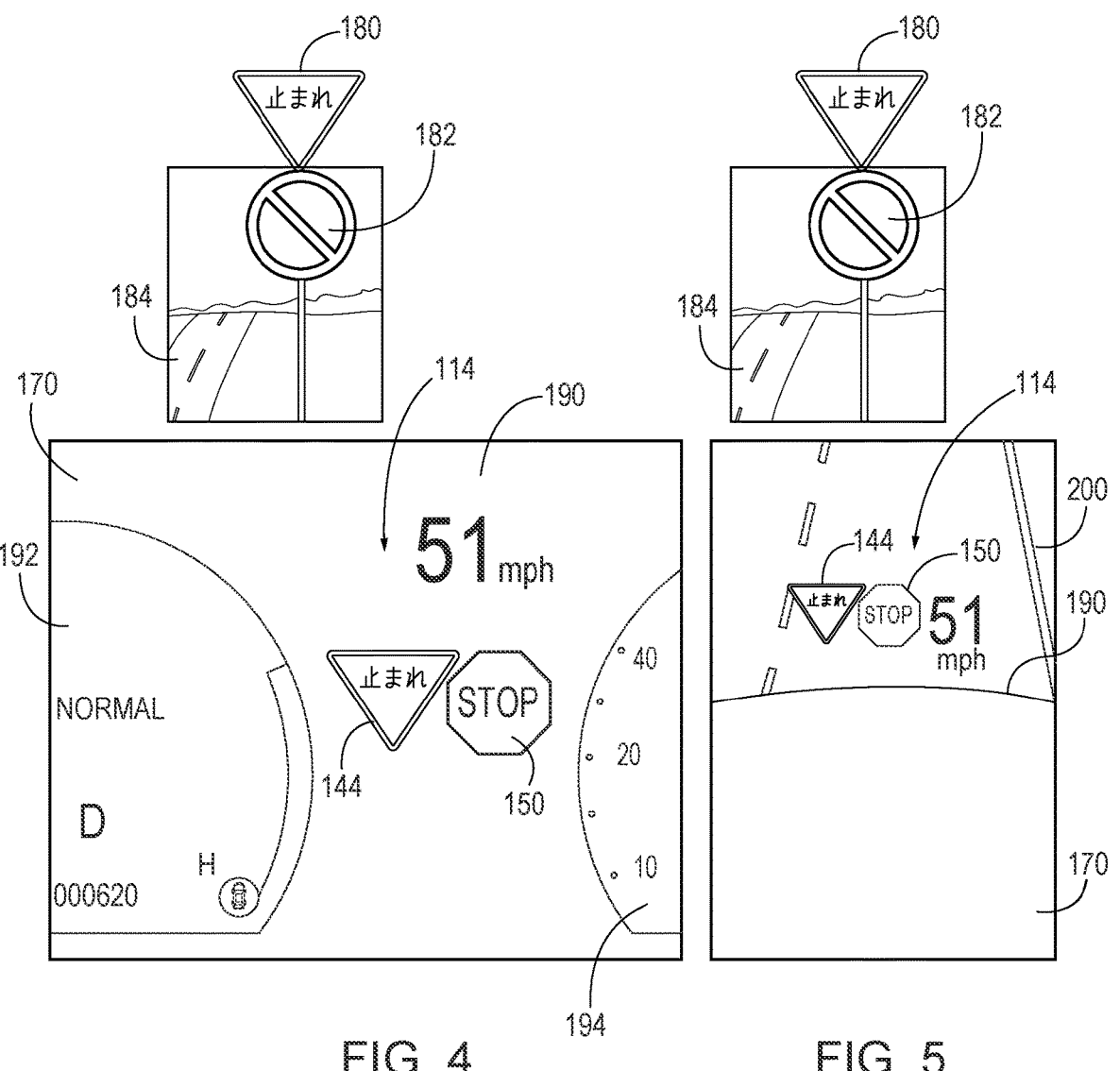
FIG. 4 is a driver perspective view of the translation system in the vehicle, where a display is a dashboard display.
FIG. 5 is a driver perspective view of the translation system in the vehicle, where the display is a heads-up display.

The computer 104 causes the display 114 to display the translations 150 associated with the model signs 144, the language original to the user 164, and the jurisdiction original to the user 164 when the computer 104 determines a detected sign in the surrounding environment of the vehicle 170 matches a model sign 144 in the database 142. FIG. 4 depicts an embodiment of the translation system 102 integrated into the vehicle 170, including the display 114 as a dashboard display. FIG. 5 depicts an embodiment of the translation system 102 integrated into the vehicle 170, including the display 114 as a heads-up display.

With reference to the embodiments depicted in FIGS. 4 and 5, the vehicle 170 is located at the rural village of Shirakawa, in Ono District, Gifu Prefecture, Japan. The computer 104 has updated the database 142 in accordance with the local, state, and national jurisdictions of the vehicle 170 based on location signals received via the receiver 112. The language original to the user 164 is set as English, and the original jurisdiction of the user 164 is set to the city of Cleveland in Ohio, United States.

Image data from the camera 110 indicates a first detected sign 180 that is a stop sign and a second detected sign 182 that is a no parking sign, ahead of the vehicle 170 on a roadway 184 in the surrounding environment of the vehicle 170. Information provided by the display 114 includes a model sign 144 matching the first detected sign 180 in the database 142, and an associated translation 150. By displaying both the model sign 144 and the associated translation 150, the computer 104 enables the user 164 to more easily associate the translation 150 with the first detected sign 180 while operating the vehicle 170.

As shown in FIG. 4, the display 114 is configured to display information on a dashboard 190 of the vehicle 170, between a tachometer 192 and a speedometer 194. As shown in FIG. 5, the display 114 is configured to display information above the dashboard 190, in a line of sight between the user 164 and a windshield 200 of the vehicle 170.

With reference to the embodiments depicted in FIGS. 4 and 5, when the computer 104 determines a plurality of detected signs including the first detected sign 180 and the second detected sign 182 from the image data at a same time, the computer 104 is configured to determine translations 150 associated with model signs 144 matching the plurality of detected signs. The computer 104 is also configured to determine a priority for displaying the translations 150 with respect to each other using the display 114.

The computer 104 may determine the priority for displaying the translations 150 based on a predetermined relevance to safety in operating the vehicle 170. In the depicted embodiments of FIGS. 4 and 5 for example, the computer 104 may determine that the second detected sign 182 is less relevant to safely operating the vehicle 170 as compared to the first detected sign 180 because the vehicle 170 is driving along the roadway 184, and not engaging in a parking operation prohibited by the second detected sign 182. As such, the computer 104 may determine that the second detected sign 182 has a lower priority for display on the display 114 as compared to the first detected sign 180.

The computer 104 may also determine the priority for displaying the translations 150 based on whether a detected sign corresponding to a translation 150 is located on a predetermined travel route of the vehicle 170, or whether the detected sign is associated with driving instructions in the database 142 which impact the predetermined travel route of the vehicle 170. For example, the computer 104 may determine that the second detected sign 182 does not impact the predetermined travel route of the vehicle 170 because the predetermined travel route does not call for parking the vehicle 170 in a manner that violates driving instructions associated with the model sign 144 matching the second detected sign 182 in the database 142. As such, the computer 104 may determine that the second detected sign 182 has a lower priority for display on the display 114 as compared to the first detected sign 180.

The computer 104 may also determine the priority for displaying the translations 150 based on an amount of space available on the display 114 at the same time. With reference to FIG. 4, the computer 104 may determine the priority for displaying the translations 150 based on an amount of space on the dashboard 190 between the tachometer 192 and the speedometer 194. While, as depicted, the translations 150 are shown on the display 114 between the tachometer 192 and the speedometer 194 as display elements, the translations 150 may be disposed elsewhere on the display 114, and similarly sized between adjacent display elements without departing from the scope of the present disclosure. Also, the display 114 may include additional or alternative display elements with respect to the tachometer 192 and the speedometer 194 without depart from the scope of the present disclosure.

With reference to FIG. 5, the computer 104 may determine the priority for displaying the translations 150 based on an amount of space available in the line of sight between the user 164 and the windshield 200. The computer 104 may further determine the priority for displaying the translations 150 based on a relatively restricted amount of space available in the line of sight between the user 164 and the windshield 200, above the dashboard 190, so as to avoid substantially obstructing a view of the surrounding environment to the user 164 with information on the display 114.

While, as depicted in FIGS. 4 and 5, the computer 104 causes the display 114 to display both the model sign 144 matching the first detected sign 180 and the associated translation 150, the computer 104 may alternatively cause the display 114 to display only translations 150 associated with the model signs 144 matching the first detected sign 180 and the second detected sign 182 based on the amount of space available on the display 114. In this manner, the computer 104 may display more translations 150 to the user 164 within a limited amount of space available on the display 114.

The computer 104 may also determine the priority for displaying the translations 150 based on aspects of the model signs 144 stored in the database 142, including a rarity of a detected sign in a geographic area or jurisdiction in which the vehicle 170 is located. In this regard, the computer 104 may determine a detected sign that is relatively unique to have a higher priority for presentation on the display 114. In this manner, the computer 104 is configured to display translations 150 of detected signs that the user 164 may be less likely to recognize from past experiences in that geographic area or jurisdiction.

The computer 104 may also determine the priority for displaying the translations 150 based on whether a model sign 144 presents variable information, such as a speed limit sign, or other complex alphanumeric information, such as a time-of-day parking sign. In this manner, the computer 104 is configured to display translations 150 of detected signs that the user 164 may be unable to interpret, despite a potentially high frequency of such signs in a present jurisdiction or geographic area.

The computer 104 may also determine the priority for displaying the translations 150 based on a similarity between a model sign 144 and the associated translation 150. For example, with reference to FIG. 2, the computer 104 may determine that a shape and a color of model signs 144 representing stop signs in the United States and Mexico are similar, and reduce a priority for displaying translations 150 of these model signs 144 to the user 164 when the user 164 has their translated jurisdiction set to the United States and is traveling in Mexico. In this manner, the computer 104 is configured to display translations 150 of detected signs that the user 164 is less likely to recognize based on the translated jurisdiction or language.

The computer 104 causes the display 114 to display the translations 150 based on the determined priority. In the depicted embodiments of FIGS. 4 and 5, the computer 104 determined the model sign 144 and the translation 150 representing the first detected sign 180 have a higher priority for presentation on the display 114 as compared to the second detected sign 182. As such, a translation for the second detected sign 182 is not shown on the display 114, reducing an overall required space taken by the display 114, and prioritizing that space for the first detected sign 180. In an embodiment, the computer 104 displays translations 150 having a relatively high priority as at least one of animated, highlighted, or larger in size on the display as compared to translations having a relatively low priority.

Referring back to FIG. 2, the database includes text translations 160 associated with the model signs 144. When the computer 104 determines that the image data indicates a detected sign that matches a model sign 144 with no available translation 150 that is a sign, the computer 104 causes the display 114 to display a text translation 160 associated with the model sign 144.

Figures 6, 7:
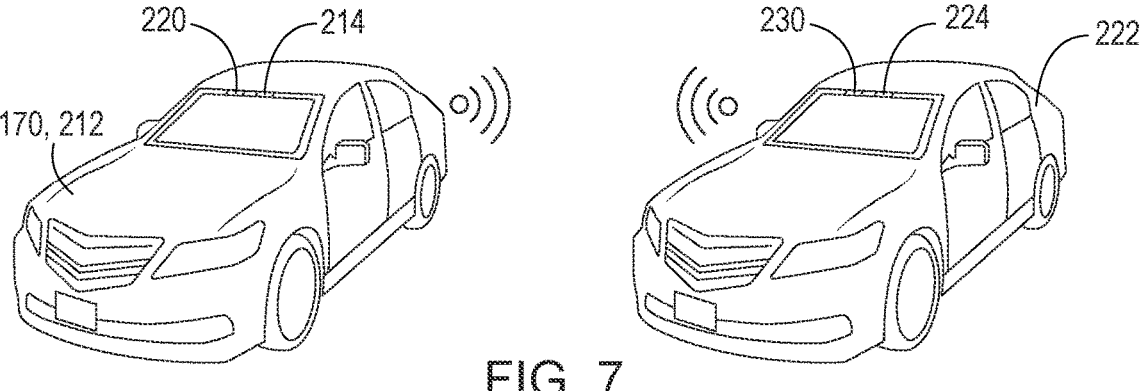
FIG. 6 is a first database and a second database included in the translation system.
FIG. 7 is a perspective view of a first vehicle and a second vehicle included in the translation system, performing vehicle to vehicle communication.

FIG. 6 depicts an embodiment of the translation system 102 where the database 142 is a first database 204 stored local to the computer 104, and the model signs included in the first database 204 are updated in accordance with a jurisdiction including a most recently recorded position of the computer 104 with the receiver 112. The translation system 102 also includes a second database 210 stored local to the computer 104, where the second database 210 is updated in accordance with a jurisdiction foreign to the current position of the computer 104.

When the computer 104 determines that a detected sign does not match any model sign 144 in the first database 204, the computer 104 determines whether the detected sign matches a model sign 144 in the second database 210. In further embodiments, after determining the detected sign does not match any model sign 144 in the first database 204, the computer 104 is configured to determine whether a detected sign matches model signs 144 from a plurality of databases including the second database 210, where each database in the plurality of databases respectively corresponds to a jurisdiction foreign to the first database 204. The computer 104 may further determine an order for determining matching model signs 144 in the first database 204 and the plurality of databases based on which databases have contained most recent matching model signs 144.

In this manner, the computer 104 may determine a model sign 144 matching a detected sign from a foreign jurisdiction while maintaining relatively small databases to search through, even when the computer 104 is offline or otherwise disconnected from the network 124 and the cloud computing platform 122. With this construction, the computer 104 processes fewer model signs 144 as compared to processing a single database containing all known model signs 144 from every jurisdiction included in the translation system 102, thereby increasing an efficiency and reliability by which the translation system 102 determines matching model signs 144 and associated translations 150 in operation.

When the computer 104 determines that the image data indicates a detected sign does not match any model sign 144 in any of the first database 204 or the plurality of databases including the second database 210, the computer 104 is configured to upload image data indicating the detected sign to the cloud computing platform 122 via the network 124. The computer 104 is also configured to receive sign information regarding the detected sign from the cloud computing platform 122, including a new model sign 144, a translation 150, jurisdiction data 152, language data 154, and text translations 160 associated with the detected sign. The computer 104 is also configured to update each of the first database 204 and the plurality of databases including the second database 210 to include the sign information from the cloud computing platform 122 based on the jurisdiction data 152. In an embodiment, the computer 104 may alternatively determine a new model sign 144 for the detected sign based on the image data.

FIG. 7 depicts an embodiment of the translation system 102 including the vehicle 170 as a first vehicle 212, where the first vehicle 212 includes the computer 104 as a first ECU 214, and the camera 110 as a first camera 220. The translation system 102 also includes a second vehicle 222 with a second ECU 224 and a second camera 230 that respectively include similar features, and function in a similar manner as the computer 104 and the camera 110.

The second ECU 224 is configured to perform vehicle to vehicle communication with the first ECU 214, where the first ECU 214 transmits database information indicating the new model sign 144 and the translation 150 received from the cloud computing platform 122. In this manner, the first vehicle 212 is configured to communicate the sign information received from the cloud computing platform 122 regarding the detected sign.

As such, the second ECU 224 may receive the sign information from the cloud computing platform 122 without directly communicating with the cloud computing platform 122. With this construction, the translation system 102 is configured to distribute sign information among a plurality of vehicles while reducing a required amount and level of connectivity and communication between the cloud computing platform 122 and individual vehicles among the plurality of vehicles.

Figure 8:
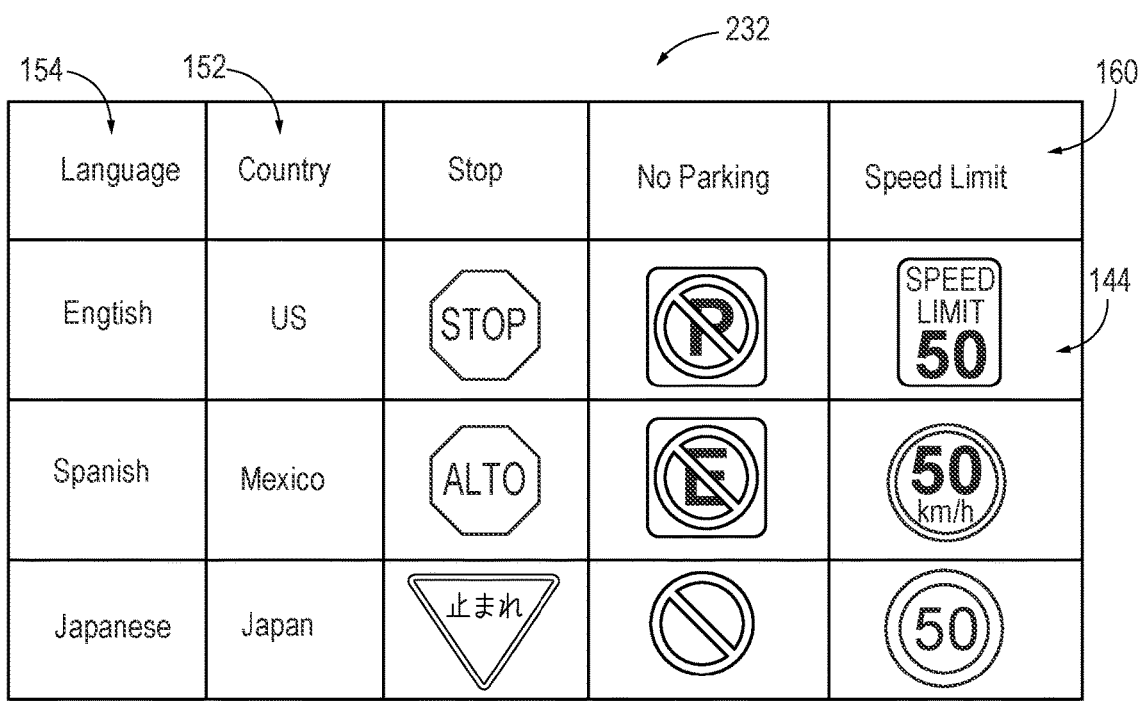
FIG. 8 is a communal index maintained by the translation system and accessible by the first vehicle and the second vehicle.

FIG. 8 depicts a communal index 232 of sign information included in the translation system 102, and accessible to a plurality of vehicles including the first vehicle 212 and the second vehicle 222 from the cloud computing platform 122. In this regard, the network 124 is operatively connected to the first ECU 214 and the second ECU 224, where the first ECU 214 and the second ECU 224 are configured to access the communal index 232. Each of the first ECU 214 and the second ECU 224 is configured to update the communal index 232 based on image data respectively captured by the first camera 220 and the second camera 230.

The first ECU 214 is configured to update the database 142 based on a most recent update of the communal index 232, and the second ECU 224 is configured to update a local database based on a most recent update of the communal index 232. In this manner, the first ECU 214 and the second ECU 224 are configured to update local databases based on image data shared between the first vehicle 212 and the second vehicle 222 via the cloud computing platform 122, even when the first vehicle 212 and the second vehicle 222 are out of range or otherwise disconnected for vehicle to vehicle communication. Further, each vehicle in the plurality of vehicles including the first vehicle 212 and the second vehicle 222 includes similar features and function in a similar manner as the first vehicle 212 and the second vehicle 222 to update local databases for independent operation.

Figure 9:
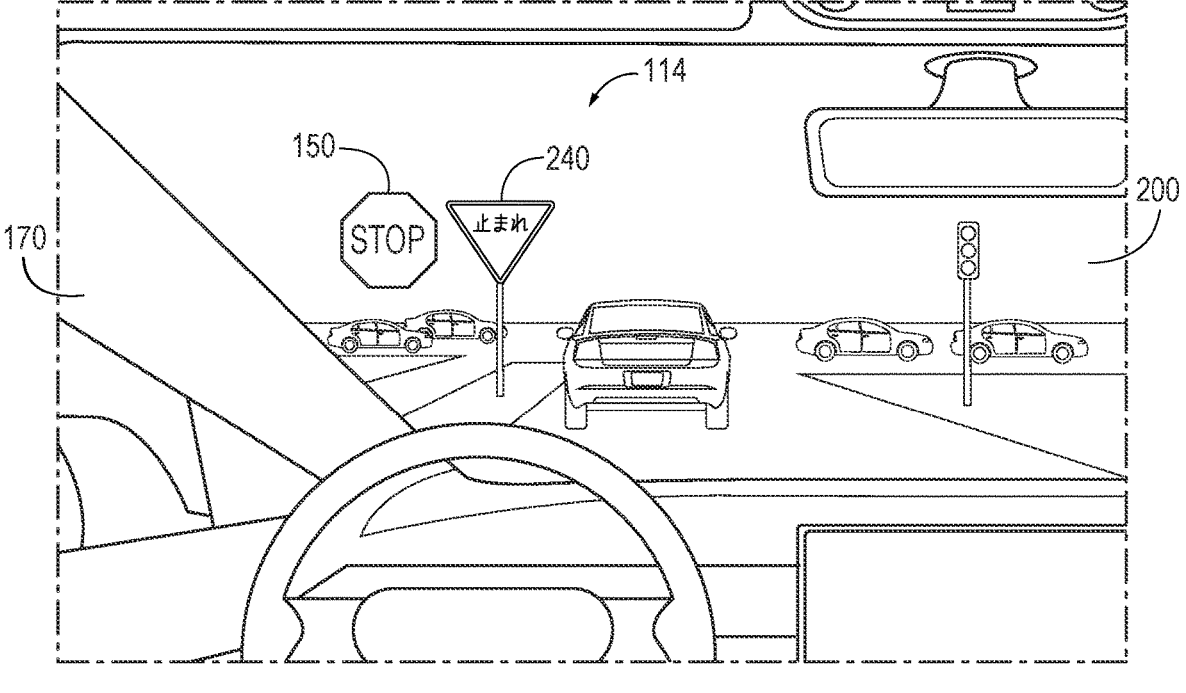
FIG. 9 is a driver perspective view of the translation system in the vehicle, where the display is an augmented reality display.

FIG. 9 depicts an embodiment of the translation system 102 incorporated in the vehicle 170, where the display 114 is an augmented reality display included in the vehicle 170. The display 114 is configured to display information overlaying the surrounding environment of the vehicle 170 at a line of sight between the user 164 as a driver of the vehicle 170 and the windshield 200 from a perspective of the user 164.

As shown in FIG. 9, the computer 104 causes the display 114 to display a translation 150 offset from a detected sign 240, within a body length of the detected sign 240 from the perspective the user 164. In this manner, the computer 104 is configured to enable the user 164 to view both the detected sign 240 and the associated translation 150 without requiring that the user 164 deviate their view form the surrounding environment of the vehicle 170. With this construction, the user 164 may associate the translation 150 presented on the display 114 with the detected sign 240 more easily. Also, because the user 164 is able to view both the detected sign 240 and the associated translation 150, the user 164 does not have to completely rely on the computer 104 correctly associating the translation 150 with the detected sign 240.

Figures 10, 11, 12:
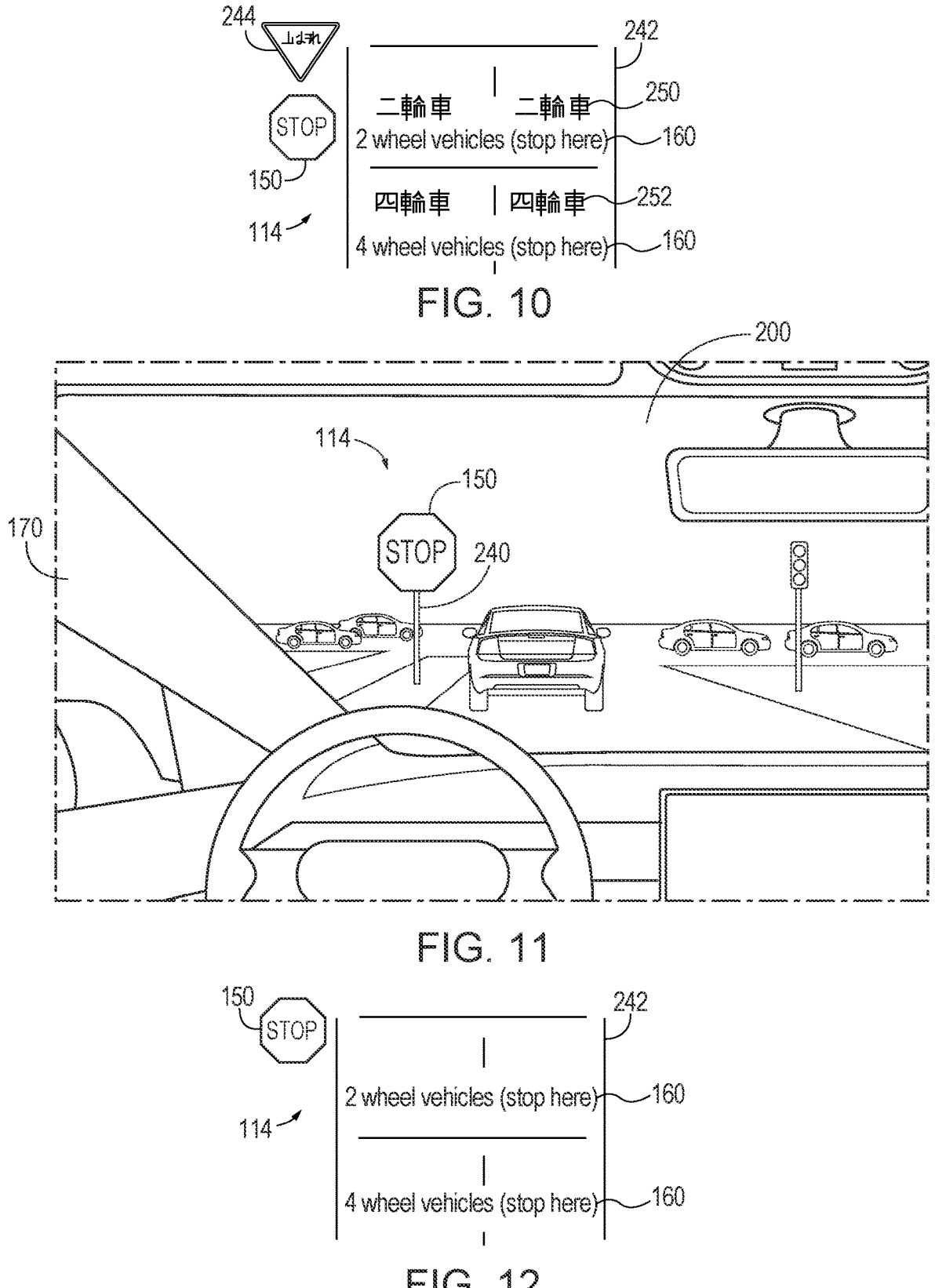
FIG. 10 is a top view of a roadway as a surrounding environment of the vehicle.
FIG. 11 is another driver perspective view of the translation system in the vehicle, where the display is an augmented reality display.
FIG. 12 is another top view of the roadway.

FIG. 10 depicts a road segment 242 located in Japan as the surrounding environment of the vehicle 170. The road segment 242 includes a first detected sign 244 that is a stop sign, a second detected sign 250 that is a road marking indicating a stopping position for 2 wheel vehicles, and a third detected sign 252 that is a road marking indicating a stopping position for 4 wheel vehicles.

As shown in FIG. 10, the computer 104 displays a translation 150 associated with the first detected sign 244, and displays text translations 160 of the second detected sign 250 and the third detected sign 252. The translation 150 associated with the first detected sign 244 is displayed offset from the first detected sign 244, within a predetermined length such as a body length of the first detected sign 244 in a direction of the offset, from the perspective of the user 164.

The text translation 160 associated with the second detected sign 250 is displayed offset from the second detected sign 250, within a body length of the second detected sign 250 in a direction of the offset, from the perspective of the user 164. The text translation 160 associated with the third detected sign 252 is displayed offset from the third detected sign 252, within a body length of the third detected sign 252 in a direction of the offset, from the perspective of the user 164. In this manner, the computer 104 is configured to organize the translations 150 and the text translations 160 associated with a plurality of detected signs, such as the first detected sign 244, the second detected sign 250, and the third detected sign 252, in a space efficient manner where the user 164 may easily associate the translations 150 and the text translations 160 with the plurality of detected signs.

FIG. 11 depicts an embodiment where the computer 104 causes the display 114 to display a translation 150 by augmenting aspects of a detected sign from the perspective of the user 164. The computer 104 and the display 114 are configured to augment any combination of a shape, a color, and an alphanumeric text of a detected sign to match a translation 150 having a language and a jurisdiction associated with the user 164 in the database 142. As depicted in FIG. 11, a shape and text of the detected sign 240 are augmented by the computer 104 and the display 114 to match a translation 150 with text in the English language, and a shape and color from a United States jurisdiction.

FIG. 12 depicts the road segment 242 where the computer 104 and the display 114 augment the first detected sign 244 to match an associated translation 150 for the user 164 in the English language, and a shape and color from a United States jurisdiction. The computer 104 and the display 114 also augment text of the second detected sign 250 and the third detected sign 252 to match text translations 160 of the road markings. By augmenting detected signs, the computer 104 is configured to conserve space on the display 114 and avoid obstructing a view of the surrounding environment of the vehicle 170 to the user 164.

Figures 13, 14:
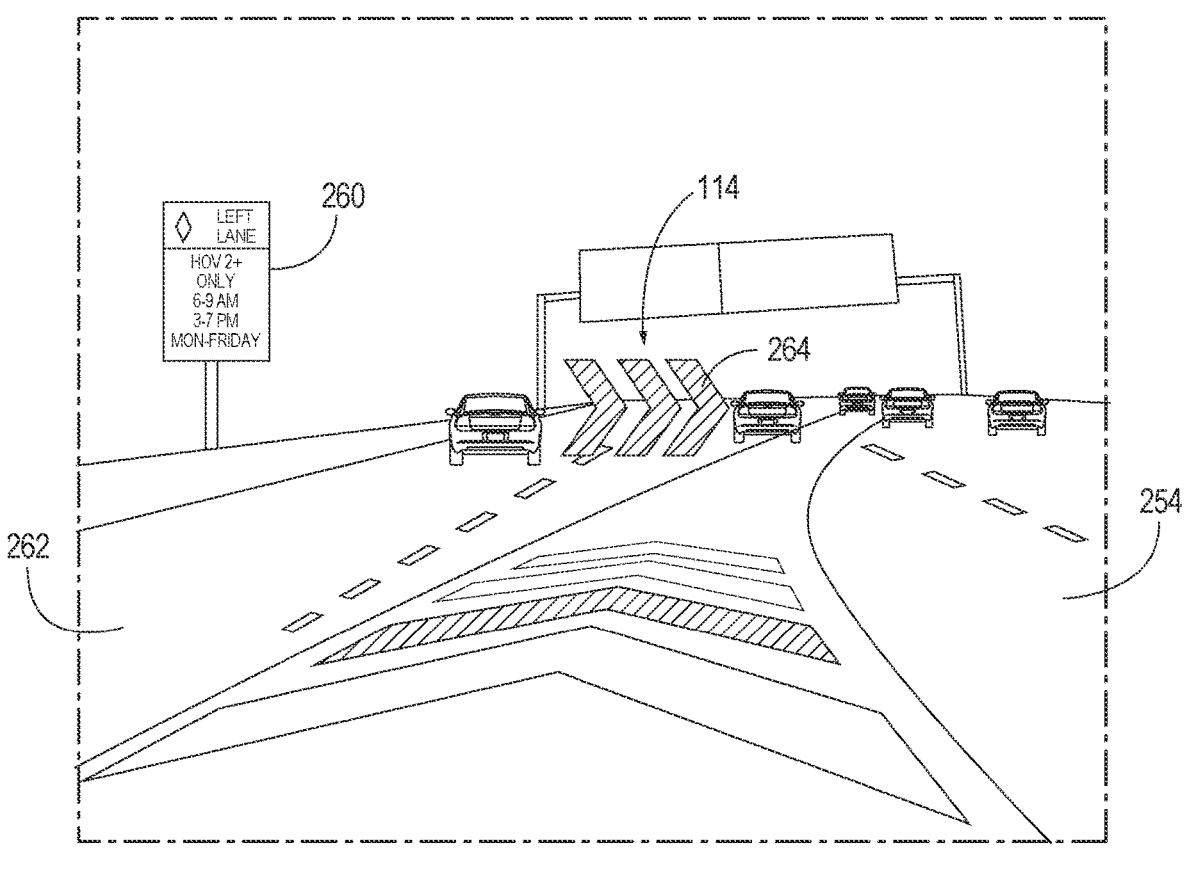
FIG. 13 is another driver perspective view of the translation system in the vehicle, where the display is an augmented reality display.
FIG. 14 is an exemplary process flow for translating and displaying a sign using the translation system, according to one aspect.

FIG. 13 depicts a roadway 254 as a surrounding environment of the vehicle 170, where the computer 104 causes the display 114 to display a lane change recommendation for the vehicle 170 based on driving instructions associated with a model sign 144 that matches a detected sign 260. In an embodiment where the computer 104 maintains a predetermined travel route for the vehicle 170, the computer 104 is also configured to display updated travel route information for the vehicle 170 based on the driving instructions.

The computer 104 may display the lane change recommendation and the updated travel route information based on a variety of driving instructions, including instructions which incorporate occupant information and time-of-day information. As shown in FIG. 13, the detected sign 260 indicates that a left lane 262 of the roadway 254 is a dedicated carpool lane during specific times of specific days of the week.

In response to determining the detected sign 260 from the image data, matching the detected sign 260 to the model sign 144, and identifying driving instructions associated with the model sign 144 in the database 142, the computer 104 causes the display 114 to display a lane change recommendation 264 to the user 164. The computer 104 determines the lane change recommendation 264 based on the occupant information generated by the interior sensor 172, and time-of-day information generated by at least one of a clock local to the computer 104 or a clock accessed via the network 124.

In this manner, when the computer 104 determines that the detected sign 260 matches the model sign 144 indicating restricted lane access, the computer 104 causes the display 114 to display at least one of the lane change recommendation 264 and updated travel route information for the vehicle 170 based on the model sign 144, the associated driving instructions, the occupant information, and the time-of-day information.

Methods for Operating the Translation System

Referring to FIG. 14, a computer-implemented method for translating and displaying signs to the user 164 with the translation system 102 will be described according to an exemplary embodiment. FIG. 14 will be described with reference to FIGS. 1-13. For simplicity, the method 300 will be described as a sequence of blocks, but the elements of the method 300 may be organized into different architectures, elements, stages, and/or processes.

At block 302, the method 300 includes generating image data using the camera 110, and transmitting the image data to the computer 104. The computer 104 is configured to access to the database 142, which is stored local to the computer 104 and includes model signs 144 and translations 150 associated with the model signs 144.

At block 304, the method 300 includes determining whether the image data indicates a detected sign, and whether the detected sign matches a model sign 144 in the database 142 using the computer 104. At block 310, the method 300 includes displaying a translation 150 associated with a model sign 144 in the database 142 when the computer 104 determines that the image data indicates a detected sign that matches the model sign 144.

In an embodiment of the method 300 where the computer 104 includes an ECU of the vehicle 170, and the camera 110 is mounted on the vehicle 170 for detecting signs in a surrounding environment of the vehicle 170, the step of displaying the translation 150 includes causing the display 114 as one of a dashboard display, a heads-up display, and an augmented reality display included in the vehicle 170 to display the translation 150.

Figure 15:
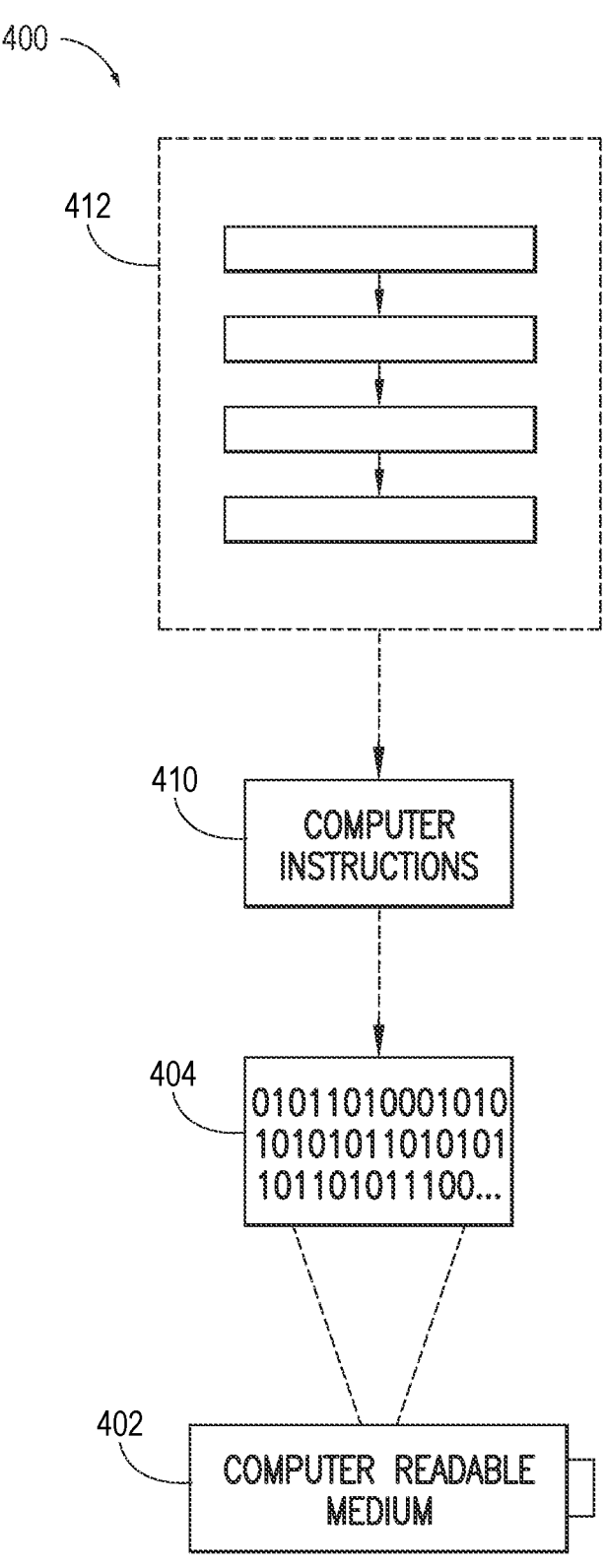
FIG. 15 is an illustration of a computer-readable medium or computer-readable device including processor-executable instructions configured to embody one or more of the provisions set forth herein, according to one aspect.

Still another aspect involves a non-transitory computer-readable medium including processor-executable instructions configured to implement one aspect of the techniques presented herein. An aspect of a computer-readable medium or a computer-readable device devised in these ways is illustrated in FIG. 15, where an implementation 400 includes a computer-readable medium 402, such as a CD-R, DVD-R, flash drive, a platter of a hard disk drive, etc., on which is encoded computer-readable data 404. This encoded computer-readable data 404, such as binary data including a plurality of zero's and one's as shown in 404, in turn includes a set of processor-executable computer instructions 410 configured to operate according to one or more of the principles set forth herein. In this implementation 400, the processor-executable computer instructions 410 may be configured to perform a method 412, such as the method 300 of FIG. 14. In another aspect, the processor-executable computer instructions 410 may be configured to implement a system, such as the operating environment 100 of FIG. 1. Many such computer-readable media may be devised by those of ordinary skill in the art that are configured to operate in accordance with the techniques presented herein.

As used in this application, the terms "component", "module," "system", "interface", and the like are generally intended to refer to a computer-related entity, either hardware, a combination of hardware and software, software, or software in execution. For example, a component may be, but is not limited to being, a process running on a processor, a processing unit, an object, an executable, a thread of execution, a program, or a computer. By way of illustration, both an application running on a controller and the controller may be a component. One or more components residing within a process or thread of execution and a component may be localized on one computer or distributed between two or more computers.

Further, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

The term "computer readable media" includes communication media. Communication media typically embodies computer readable instructions or other data in a "modulated data signal" such as a carrier wave or other transport mechanism and includes any information delivery media. The term "modulated data signal" includes a signal that has one or more of its characteristics set or changed in such a manner as to encode information in the signal.

Although the subject matter has been described in language specific to structural features or methodological acts, it is to be understood that the subject matter of the appended claims is not necessarily limited to the specific features or acts described above. Rather, the specific features and acts described above are disclosed as example aspects. Various operations of aspects are provided herein. The order in which one or more or all of the operations are described should not be construed as to imply that these operations are necessarily order dependent. Alternative ordering will be appreciated based on this description. Further, not all operations may necessarily be present in each aspect provided herein.

As used in this application, "or" is intended to mean an inclusive "or" rather than an exclusive "or". Further, an inclusive "or" may include any combination thereof (e.g., A, B, or any combination thereof). In addition, "a" and "an" as used in this application are generally construed to mean "one or more" unless specified otherwise or clear from context to be directed to a singular form. Additionally, at least one of A and B and/or the like generally means A or B or both A and B. Further, to the extent that "includes", "having", "has", "with", or variants thereof are used in either the detailed description or the claims, such terms are intended to be inclusive in a manner similar to the term "comprising".

Further, unless specified otherwise, "first", "second", or the like are not intended to imply a temporal aspect, a spatial aspect, an ordering, etc. Rather, such terms are merely used as identifiers, names, etc. for features, elements, items, etc. For example, a first channel and a second channel generally correspond to channel A and channel B or two different or two identical channels or the same channel. Additionally, "comprising", "comprises", "including", "includes", or the like generally means comprising or including, but not limited to.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A vehicle system for translating and displaying signs, the vehicle system comprising:

at least one computer configured to access a database of model signs, wherein the database is stored local to the at least one computer and includes translations associated with the model signs;

a camera configured to generate image data, and transmit the image data to the at least one computer, wherein the at least one computer is configured to determine whether the image data indicates a detected sign, and whether the detected sign matches one of the model signs in the database, wherein a model sign matching the detected sign is a matching model sign; and a display operatively connected with the at least one computer and configured to display a translation associated with the matching model sign in the database when the at least one computer determines that the image data indicates a detected sign that matches one of the model signs, further comprising a vehicle, wherein the at least one computer includes an electronic control unit (ECU) of the vehicle, the camera is mounted on the vehicle for capturing the image data and detecting signs in a surrounding environment of the vehicle, wherein when the ECU determines a plurality of detected signs from the image data at a same time, the ECU is configured to:

determine translations associated with matching model signs corresponding to the plurality of detected signs;

determine a priority for displaying the translations with respect to each other, using the display, and based on at least one of:

a predetermined relevance to safety in operating the vehicle;

whether a detected sign corresponding to a translation is located on a predetermined travel route of the vehicle;

whether the predetermined travel route violates driving instructions associated with one of the matching model signs; and an amount of space available on the display at the same time; and cause the display to display the translations based on the priority.

2. The system of claim 1, wherein the display is at least one of a dashboard display and a heads-up display included in the vehicle.

3. The system of claim 2, wherein the database includes driving instructions associated with the model signs, and the at least one computer causes the display to display at least one of a lane recommendation and updated travel route information for the vehicle based on driving instructions associated with the matching model sign.

4. The system of claim 2, further comprising an interior sensor fixed to the vehicle, wherein the interior sensor is configured to generate occupant information and transmit the occupant information to the at least one computer, wherein the at least one computer is configured to determine a number of occupants in the vehicle based on the occupant information, and when the at least one computer determines that the matching model sign indicates restricted lane access, the at least one computer causes the display to display at least one of a lane recommendation and updated travel route information for the vehicle based on the matching model sign and at least one of the occupant information and time-of-day information.

5. The system of claim 1, wherein the ECU is configured cause the display to display both the matching model signs and the translations at the same time based on the amount of space available on the display.

6. The system of claim 1, further comprising at least one of an interior sensor fixed to the vehicle, and a fob held by a user, wherein each of the interior sensor and the fob is configured to generate occupant information and transmit the occupant information to the at least one computer, and wherein the at least one computer is configured to identify a driver of the vehicle based on the occupant information, determine at least one of a language and a jurisdiction original to the driver based on the occupant information, update the database to include translations associated with the model signs and the at least one of the language and the jurisdiction, and cause the display to display the translations associated with the at least one of the language and the jurisdiction.

7. The system of claim 1, further comprising a receiver in a global positioning system, wherein the at least one computer is configured to:

determine and record a position of the receiver;

access map information indicating locations of political borders;

determine whether the receiver has crossed a political border based on the recorded position and the map information; and update the database when the position of the receiver crosses a political border, in accordance with a jurisdiction local to a most recently recorded position of the receiver.

8. The system of claim 1, wherein the database is a first database, and the model signs included in the first database are updated in accordance with a jurisdiction including a most recently recorded position of the at least one computer, the system further comprises a second database stored local to the at least one computer, wherein the second database is updated in accordance with a jurisdiction foreign to the current position of the at least one computer, and wherein when the at least one computer determines that the detected sign does not match any model sign in the first database, the at least one computer determines whether the detected sign matches a model sign in the second database.

9. The system of claim 1, wherein when the at least one computer determines that the image data indicates the detected sign does not match any model sign in the database, the at least one computer is configured to:

upload image data indicating the detected sign to a cloud computing platform;

receive a translation associated with the detected sign from the cloud computing platform; and update the database to include a new model sign and the received translation based on the image data uploaded to the cloud computing platform.

10. The system of claim 9, wherein the vehicle is a first vehicle and the ECU a first ECU in the first vehicle; and further including a second vehicle including a second ECU configured to perform vehicle to vehicle communication with the first ECU, wherein the first ECU transmits database information indicating the new model sign and the received translation.

11. The system of claim 1, wherein the vehicle is a first vehicle and the ECU is a first ECU in the first vehicle, and the camera is a first camera mounted on the first vehicle for detecting signs in a surrounding environment of the first vehicle;

further comprising a second vehicle including a second ECU and a second camera mounted on the second vehicle for detecting signs in a surrounding environment of the second vehicle;

a network operatively connected to the first ECU and the second ECU, wherein the first ECU and the second ECU are configured to access a communal index of model signs and translations associated with the model signs, wherein the second ECU updates the communal index based on image data captured by the second camera, and the first ECU updates the database based on a most recent update of the communal index.

12. The system of claim 1, wherein when the ECU determines the plurality of detected signs from the image data at the same time, the ECU:

determines another priority for displaying each of the translations with respect to each other, using the display, and based on aspects of the matching model signs stored in the database, including at least one of:

a rarity of the detected sign in at least one of a geographic area and a current jurisdiction of the at least one computer;

whether the detected sign presents complex alphanumeric information;

whether the detected sign presents variable information; and a similarity between the matching model sign and the translation; and causes the display to display the translations in accordance with the another priority.

13. The system of claim 12, wherein the at least one computer causes the display to display translations having a relatively high another priority as at least one of animated, highlighted, or larger in size on the display as compared to translations having a relatively low another priority.

14. The system of claim 1, wherein the database includes text translations associated with the model signs, and when the at least one computer determines that the image data indicates a detected sign corresponding to a matching model sign with no associated translation that is a sign, the at least one computer causes the display to display a text translation associated with the matching model sign.

15. The system of claim 1, wherein the vehicle includes a windshield, wherein the display is an augmented reality display included in the vehicle to display information overlaying a surrounding environment of the vehicle at a line of sight between a driver of the vehicle and the windshield from a perspective of the driver, wherein the at least one computer causes the display to display the translation by augmenting at least one of a shape, a text, a color, and a unit of measurement of the detected sign to match at least one of a language and a jurisdiction associated with the driver.

16. The system of claim 1, wherein the vehicle includes a windshield, wherein the display is an augmented reality display included in the vehicle to display information overlaying a surrounding environment of the vehicle at a line of sight between a driver of the vehicle and the windshield from a perspective of the driver, wherein the at least one computer causes the display to display the translation offset from the detected sign, within a predetermined length of the detected sign from the perspective of the driver.

17. A method for translating and displaying signs by an electronic control unit (ECU) of a vehicle, the method comprising:

generating image data using a camera mounted on the vehicle for capturing the image data and detecting signs in a surrounding environment of the vehicle, and transmitting the image data to the ECU configured to access to a database that is stored local to the ECU and includes model signs and translations associated with the model signs;

determining whether the image data indicates a detected sign, and whether the detected sign matches one of the model signs in the database using the ECU, wherein a model sign matching the detected sign is a matching model sign; and displaying on a display included in the vehicle a translation associated with the matching model sign in the database when the ECU determines that the image data indicates a detected sign that matches one of the model signs, wherein when the ECU determines a plurality of detected signs from the image data at a same time, the method includes:

determining translations associated with matching model signs corresponding to the plurality of detected signs;

determining a priority for displaying the translations with respect to each other, using the display, and based on at least one of:

a predetermined relevance to safety in operating the vehicle;

whether a detected sign corresponding to a translation is located on a predetermined travel route of the vehicle;

whether the predetermined travel route violates driving instructions associated with one of the matching model signs; and an amount of space available on the display at the same time; and cause the display to display the translations based on the priority.

18. The method of claim 17, wherein displaying the translation includes causing at least one of a dashboard display, a heads-up display, and an augmented reality display included in the vehicle to display the translation.

19. A non-transitory computer readable storage medium storing instructions that, when executed by a computer having a processor, causes the processor to perform a method, the method comprising:

generating image data using a camera mounted on a vehicle for capturing the image data and detecting signs in a surrounding environment of the vehicle, and transmitting the image data to at least one computer of the vehicle configured to access to a database that is stored local to the at least one computer and includes model signs and translations associated with the model signs;

determining whether the image data indicates a sign, and whether the sign matches one of the model signs in the database using the at least one computer, wherein a model sign matching the detected sign is a matching model sign; and displaying on a display included in the vehicle a translation associated with the matching model sign in the database when the at least one computer determines that the image data indicates a detected sign that matches one of the model signs, wherein the at least one computer includes an electronic control unit (ECU) of the vehicle, wherein when the ECU determines a plurality of detected signs from the image data at a same time, the method includes:

determining translations associated with matching model signs corresponding to the plurality of detected signs;

determining a priority for displaying the translations with respect to each other, using the display, and based on at least one of:

a predetermined relevance to safety in operating the vehicle;

whether a detected sign corresponding to a translation is located on a predetermined travel route of the vehicle;

whether the predetermined travel route violates driving instructions associated with one of the matching model signs; and an amount of space available on the display at the same time; and cause the display to display the translations based on the priority.

* * * * *